United States Patent
Timmons et al.

[19]

[11] Patent Number: 6,001,506
[45] Date of Patent: Dec. 14, 1999

[54] TERMINAL POST ASSEMBLY FOR LEAD ACID BATTERIES

[75] Inventors: John B. Timmons, Winston-Salem, N.C.; Edward F. Koss, Redlands, Calif.

[73] Assignee: Concorde Battery Corporation, Winston-Salem, N.C.

[21] Appl. No.: 08/902,669

[22] Filed: Jul. 30, 1997

[51] Int. Cl.$^6$ .................................................. H01M 2/02
[52] U.S. Cl. .......................... 429/178; 429/121; 429/179
[58] Field of Search ............................ 429/225, 65, 121, 429/178, 179, 180, 181, 183, 185

[56] References Cited

U.S. PATENT DOCUMENTS

| | | | |
|---|---|---|---|
| 3,595,701 | 7/1971 | Lewis et al. | 136/135 R |
| 3,964,934 | 6/1976 | Ching, Jr. et al. | 136/135 R |
| 4,078,122 | 3/1978 | Lotzsch et al. | 429/121 |
| 4,117,211 | 9/1978 | Schuster et al. | 429/121 |
| 4,143,215 | 3/1979 | Mocas | 429/179 |
| 4,207,384 | 6/1980 | Peters et al. | 429/54 |
| 4,472,486 | 9/1984 | Orsino et al. | 429/179 |
| 4,478,919 | 10/1984 | Tiegel | 429/179 |
| 4,482,618 | 11/1984 | Orsino et al. | 429/179 |
| 4,760,001 | 7/1988 | Nann et al. | 429/136 |
| 4,898,796 | 2/1990 | Furukawa et al. | 429/178 |
| 5,290,646 | 3/1994 | Asao et al. | 429/178 |
| 5,326,655 | 7/1994 | Mix et al. | 429/178 |
| 5,403,678 | 4/1995 | Fields | 429/65 |
| 5,422,202 | 6/1995 | Spiegelberg et al. | 429/179 |
| 5,527,642 | 6/1996 | Meadows et al. | 429/210 |
| 5,589,294 | 12/1996 | Spiegelberg et al. | 429/178 |
| 5,599,641 | 2/1997 | Ching, Jr. et al. | 429/179 |
| 5,626,984 | 5/1997 | Albini | 429/178 |

*Primary Examiner*—Maria Nuzzolillo
*Assistant Examiner*—Monique M. Wills
*Attorney, Agent, or Firm*—Rhodes, Coats & Bennett

[57] ABSTRACT

An improved terminal post assembly for lead/acid batteries in which the conventional cast lead connecting pad which connects the battery post with the threaded terminal has been replaced by a prefabricated connector formed of a light-weight material having high current capacity and creep resistance.

63 Claims, 3 Drawing Sheets

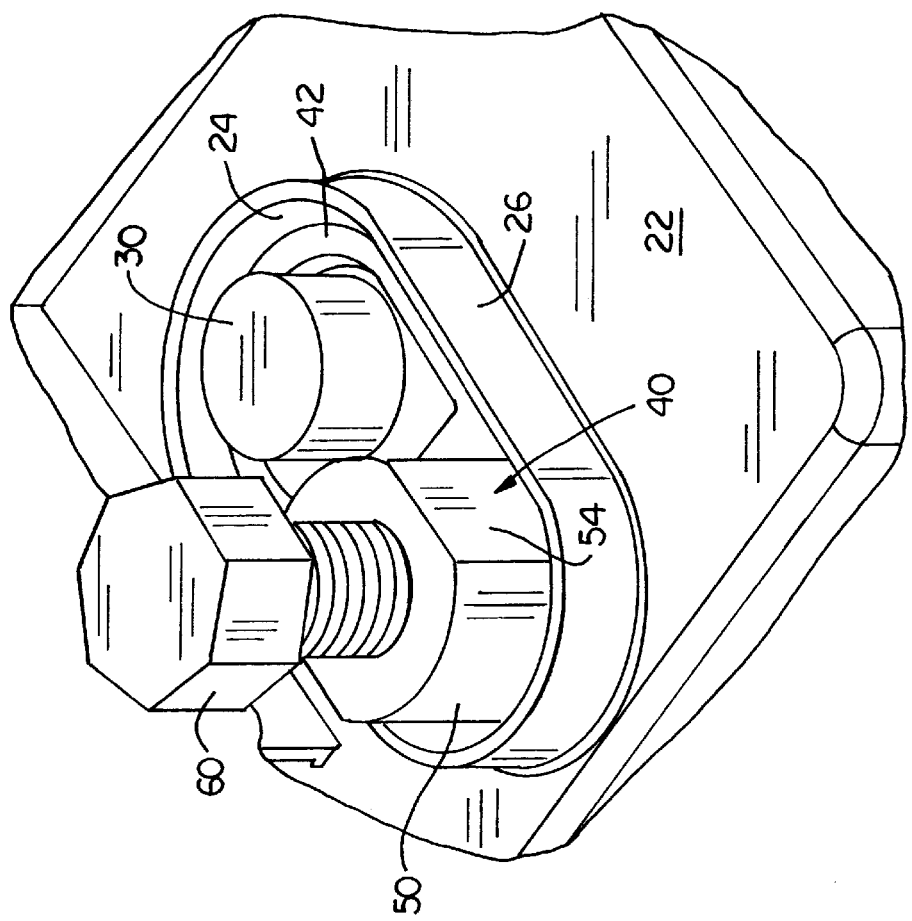
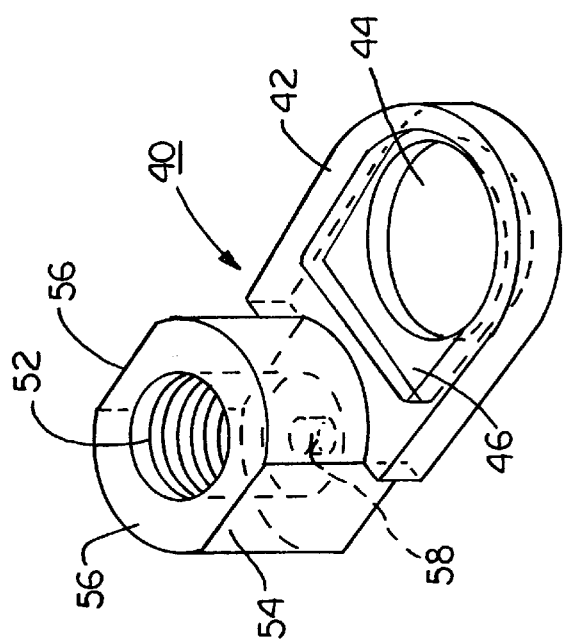

TERMINAL POST ASSEMBLY FOR LEAD ACID BATTERIES

BACKGROUND OF THE INVENTION (1) Field of the Invention

The present invention relates generally to lead/acid batteries and, more particularly, to an improved terminal post assembly for lead/acid batteries in which the conventional cast lead connecting pad which connects the battery post with the threaded terminal has been replaced by a prefabricated connector formed of a lightweight material having high current capacity and creep resistance.

(2) Description of the Prior Art

The present invention is primarily intended for and will be described in conjunction with a lead-acid aircraft battery. This type of battery generally comprises a plastic interior casing containing lead and lead-oxide plates immersed in an acid electrolyte. The lead and lead-oxide plates within the casing are interconnected and includes a lead electrode post which projects through the cover of the casing.

External terminals for the battery are generally molded into a rather large lead plug which includes an opening in one end thereof for receiving the electrode post. The terminal is connected to the post through the lead member by melting the lead of the post and the lug together.

Some types of batteries include a wall upstanding from the cover forms a well which surrounds the opening in the cover through which the electrode post extends. The lead casting is placed around the electrode post within the aforementioned well and the two lead pieces are welded or soldered together with the lead melting and generally filling the well. This lead casting gives a high electrical resistance between the terminal and the post. The instantaneous peak power or current carrying capability is therefore diminished from what the battery is theoretically capable of producing.

Further, the lead castings (2 for each battery) provide an additional 4 ounces of weight to the battery. This extra weight is important, particularly in aircraft batteries. Further, the terminal to the lead casting connection is weakened because of lead's tendency to creep. Thus terminal connections formed in this manner often become loose after several months of usage. This can create a hazard in that arcing may occur and could lead to a fire or loss of power. Obviously in an aircraft this is highly dangerous.

Thus, there remains a need for a new and improved terminal post assembly for lead/acid batteries which has increase current carrying capacity while, at the same time, is lightweight and creep resistant

SUMMARY OF THE INVENTION

The present invention is directed to an improved terminal post assembly for a lead/acid battery of the type including a casing enclosing a plurality of lead plates connected together and immersed in an appropriate acid. The assembly includes a battery cover forming a part of one of the top or side walls of the battery casing. A lead electrode post is connected at one end to the plates of the battery and the other end extends through an opening in the surface of the battery cover.

According to the present invention, a non-lead connector is attached to the end of the electrode post which extends through the surface of the battery cover. In the preferred embodiment, the connector includes a substantially flat base member having an aperture therein in one end for receiving the electrode post and a boss member extending upwardly from the other end of the base member and having a threaded bore therein for receiving a bolt to attach an electrical cable for conducting the electricity produced by the battery.

In the preferred embodiment, the connector is formed from a creep resistant copper alloy such as bronze, brass or copper-nickel. These materials exhibit lower resistance, higher conductivity, and lower creep than lead. Specifically, a connector constructed according to the present invention and formed from one of these materials is capable of carrying greater than about 1100 amps without failure. In addition, the density of these materials are less than about 80% that of lead which provides important weight savings.

A terminal is attached to the non-lead connector and receives an electrical cable for conducting the electricity produced by the battery.

Further in the preferred embodiment, a conductive transition layer is formed between the lead electrode post and the non-lead connector to help provide better physical, electrical and chemical connection between the post and the connector.

The connector itself includes: (a) a substantially flat base member having an aperture therein in one end for receiving the other end of the electrode post which extends through the surface of the battery cover; and (b) a boss member extending upwardly from the other end of the base member and having a bore therein for receiving a terminal adapted to receive an electrical cable for conducting the electricity produced by the battery. The base member includes a reservoir surrounding the aperture to provide an increased surface area to which the lead from the post may attach. The boss also includes flats on opposite sides thereof to provide a gripping surface while the terminal is tightened to avoid stress on the connector/post interface.

It is therefore an object of the present invention to provide an improved electrode post/terminal connection which has a higher current carrying capability.

It is another object of the invention to provide a connection of the type described which is less likely to fail because of arcing resulting from creep as is the case with lead connections.

It is still another object of the invention to provide a connection of the type described which is lighter in weight.

It is yet another object of the invention to provide a unique connector to accomplish the above connection which is a copper alloy.

These and other aspects of the present invention will become apparent to those skilled in the art after a reading of the following description of the preferred embodiment when considered with the drawings.

BRIEF DESCRIPTION OF THE DRAWINGS

FIG. 3 is a perspective view of the support connector itself;

FIG. 4 is a perspective view similar to FIG. 2, except the cover of the battery has been placed on the casing with the electrode post extending through the opening in the cover and the support connector has been assembled into place in the well surrounding the post in preparation for the soldering operation;

DESCRIPTION OF THE PREFERRED EMBODIMENTS

Figure 2:
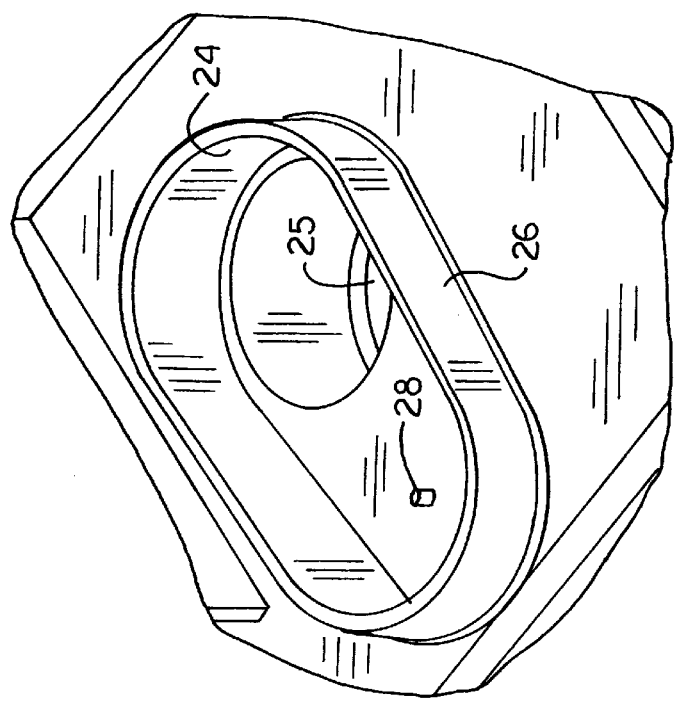
FIG. 2 is an enlarged perspective of one corner of the battery, illustrating the well which is formed in the cover for the reception of the terminal support connector.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 1:
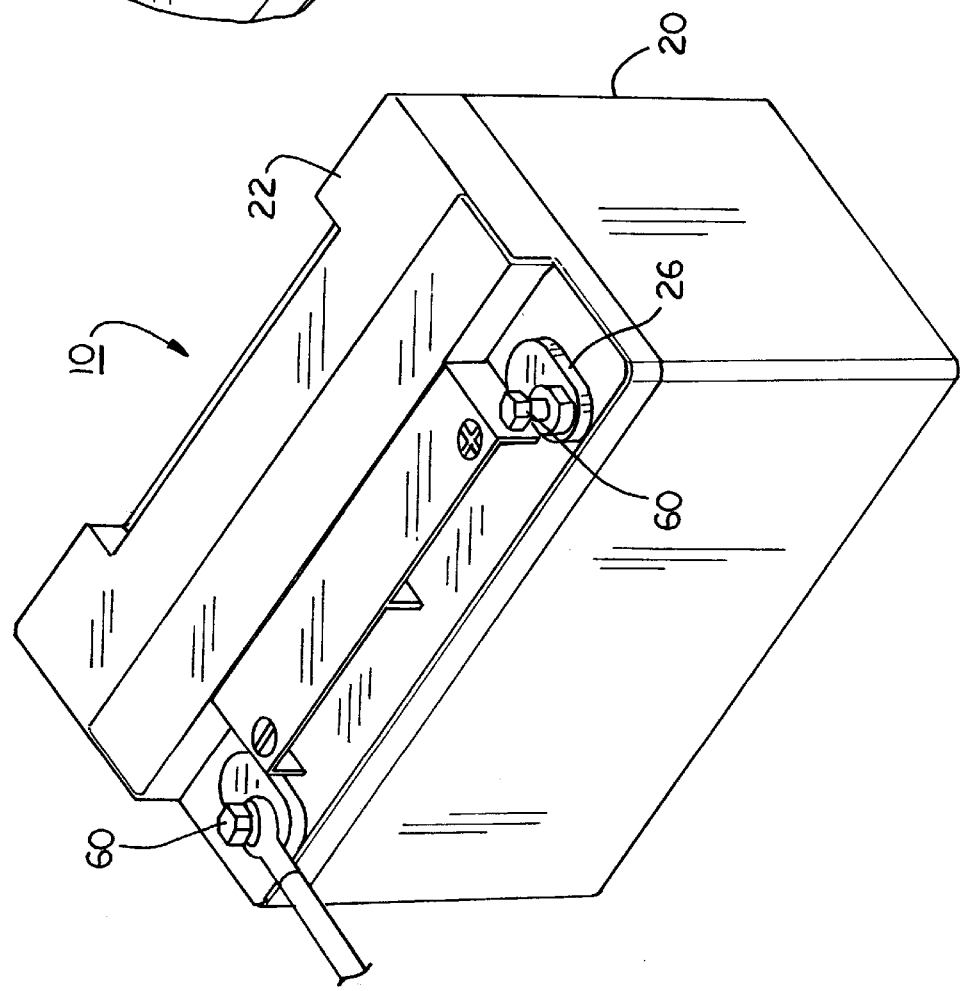
FIG. 1 is a perspective view illustrating a completed battery constructed in accordance with the present invention.
Figure 6:
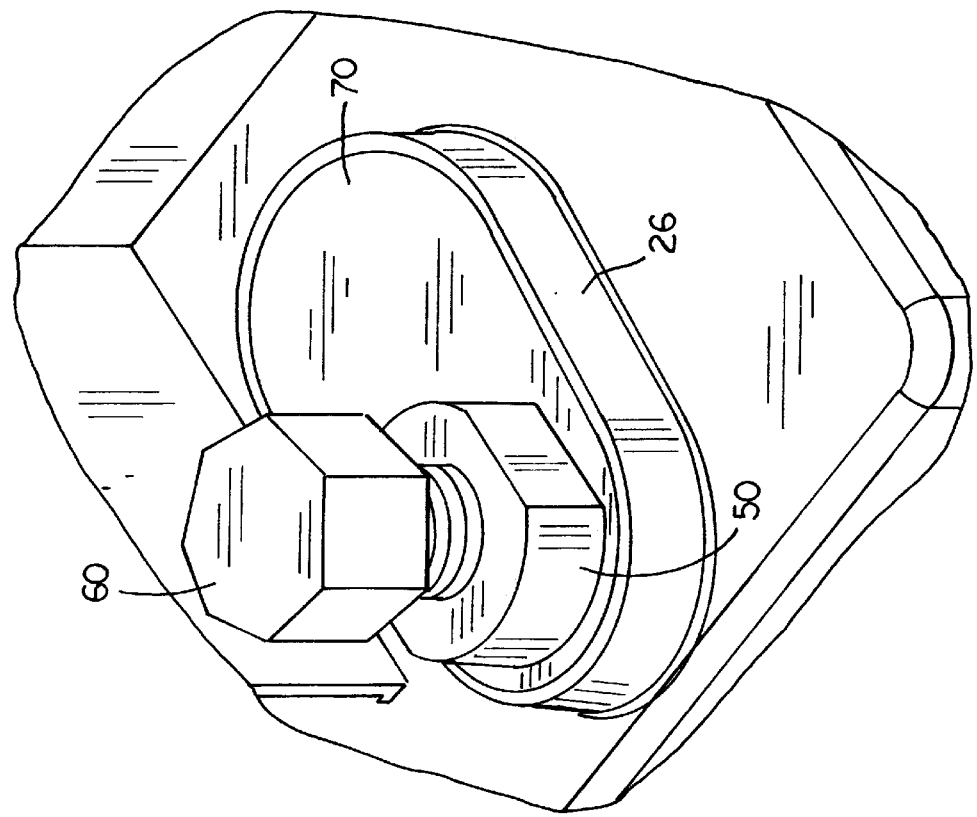
FIG. 6 is a perspective view similar to FIGS. 2, 4, and 5, except illustrating the completed terminal installation with the potting material applied.
Figure 5:
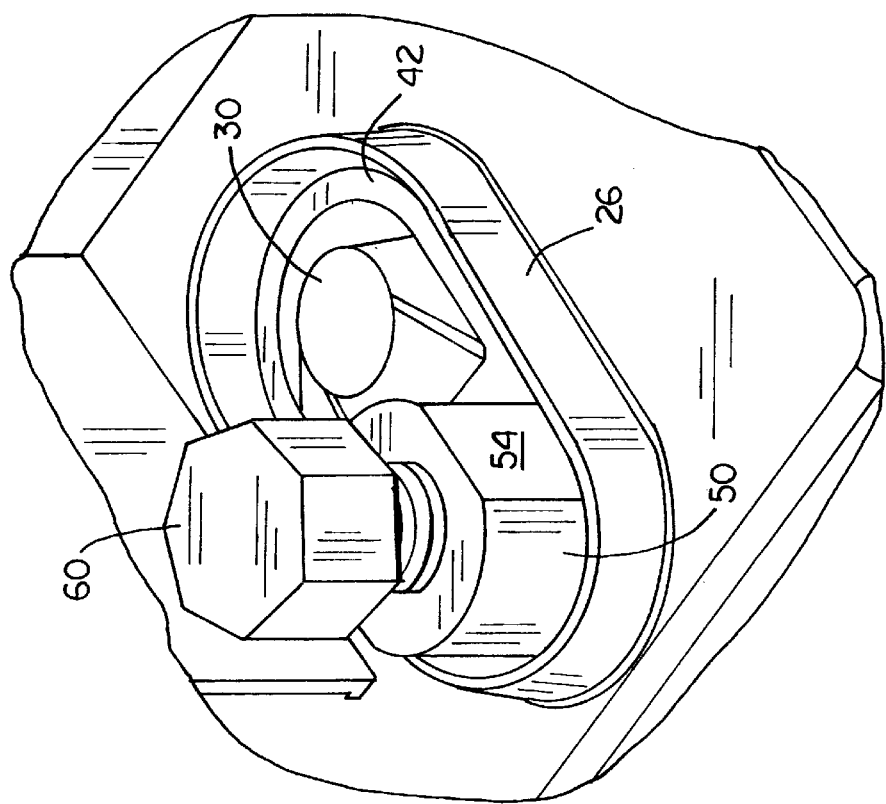
FIG. 5 is a perspective view similar to FIGS. 2 and 4, except illustrating the connector and electrode post immediately after the soldering operation.

Referring now to the drawings in general and FIG. 1 in particular, it will be understood that the illustrations are for the purpose of describing a preferred embodiment of the invention and are not intended to limit the invention thereto. As best seen in FIG. 1, a lead-acid battery, generally designated 10, is shown constructed according to the present invention and intended primarily for the aircraft industry. Battery 10 includes a casing 20 which contains the electrodes, connectors, and the battery post. Cover 22 is placed onto the casing 20 with the battery post 30 (not shown in FIG. 1) extending through cover 22. A terminal support well 24 (FIG. 2) is formed by an upstanding wall 26 which surrounds the opening 25 through which the electrode post extends and forms a well for receiving the terminal support member and the terminal.

Note in FIG. 2 that there is a locating pin 28 provided on the bottom wall or floor 27 of well 24 at the end of the well opposite the opening 25. This locating pin will be used to position the terminal support connector 40 properly within well 24 as will be described hereinafter.

The electrode post 30 is best shown in FIG. 4. Post 30 is formed substantially of lead and includes a portion which extends above the surface of the body member 42 of the terminal support connector 40 for reasons which will be described hereinafter. There is a relationship between the extent to which post 30 extends above the surface of body member 42 of terminal support connector 40.

Turning now to FIGS. 3 and FIGS. 4, there is illustrated in FIG. 3 the preferred embodiment of the terminal support connector 40 which includes generally a base or body member 42 and a boss 50 extending upwardly from the surface of base 42 and one end thereof. Base 42 includes an aperture 44 slightly larger in diameter than the electrode post 30. A recess or reservoir 46 is provided in base member 42 around aperture 44 for reasons to be described hereinafter.

Boss 50 includes a threaded opening or bore 52 which ultimately receives the threaded terminal 60 such as a bolt or stud. Boss 50 also includes two parallel sides or flats 54, 56 which provide a gripping surface to hold the connector support 40 while terminal is tightened without causing stress on the connection between the support connector 40 and the softer lead post 30. The connection between the lead post and the connector is very fragile because of the nature of lead, therefore with the present invention, the battery connections can be made without causing stress at all on the lead post/support interface.

The material from which the connector is made is extremely important. First of all, it must be a non-lead material. Lead is not a good structural material in that it tends to creep, and it is much higher in electrical resistivity (20.65 m ohms/cm) and lower in its current carrying capability when compared to other conductors (9.6 μohms/cm for bronze and 1.7 m ohms/cm for copper). Lead is also much denser (11.34 g/cc) compared to other metallic materials (8.92 g/cc for copper) which are much higher in conductivity and provide better creep resistance. For example, copper alloys such as brass and bronze, as well as copper-nickel, tellurium-copper, and beryllium-copper alloys provide an excellent material for connector 40. The preferred material is bronze.

It should be noted that preferably one end of the connector 40 is larger than the other. The connector therefore is not elliptical but asymmetrical along the longitudinal axis. This facilitates proper positioning and assembly of the connector during the manufacturing operation, as well as reducing weight. However, symmetrical shapes may be appropriate in some applications.

Such non-lead connectors exhibit about a 30%–50% increase in current carrying capability for typical terminal sizes and are able to carry at least 800 amps and preferably approximately 1100 amps before failure, compared to about 700 amps for lead. These materials are also approximately 2 ounces lighter (less than 80% the density of lead) than the lead castings previously used. The connector may be formed of powdered metal, stamped, machined, cast, or forged.

Finally, the boss 50 includes a small opening 58 in the bottom wall thereof which registers with the locating pin 28 in the bottom wall of well 24, so that the connector may be easily placed in the well in the proper position for final assembly.

To complete the assembly, the cover 22 is placed on the casing 20 with the post 30 extending upwardly through the opening in the cover. An O-ring (not shown) is placed around the electrode post 30 and positioned down in opening 25. The O-ring may be formed of any appropriate material such as an acid resistant rubber or polymeric material. The O-ring prevents leakage of the epoxy potting compound which is to be applied next down into the inside of the casing 20. At this point, a small amount of potting should be applied around the electrode post 30 and in the bottom of well 24. The battery should be charged at this point, because the sulfuric acid used to charge the battery will generate an environment of acid mist.

It is undesirable to have the terminals and terminal connector assembled at this time, because the acid mist will attack brass, bronze, copper or silver containing items in the area.

Once the battery is charged, the connector 40, is placed within the well with the opening 44 extending around electrode post 30 and the small hole 58 being placed over the locating pin 28 on the floor of well 24. Preferably, the support connector 40 is first plated or dipped in silver, gold, platinum or their alloys to provide a non-corrosive surface which ensures better connection between the electrode post and the terminals. Additionally, the seat area of the reservoir 46 also is dipped or coated with tin over the silver layer to provide better attachment between the lead and silver plated connector. Tin alloys extremely well with both lead and silver or even gold (should gold be used for the terminal plating). Thus, there is provided a transition layer between the brass connector and the lead electrode post. A first component of the transition layer is a copper protecting, non-corrosive coating such as silver or gold. Secondly, there is a layer of tin to provide better compatibility between the lead of the electrode post 30 and the silver plating of the connector 40.

The connector 40 is then soldered to post 30. During the soldering operation, the lead heats and melts. The volume of lead extending above the surface of the base member 42 is just sufficient to ensure that the reservoir 46 is filled with lead. Because of the reservoir configuration in the base member, there is more surface area for the lead to attach to, and therefor a better bonding result is attained. Finally, additional epoxy potting compound is used to fill the well 24 substantially level with the upper extremity of the wall 26. The terminal 60 may be later attached by the customer at the time the battery is installed.

Certain modifications and improvements will occur to those skilled in the art upon a reading of the foregoing description. By way of example, a terminal in which the terminal connector is formed in such a way as to mate with a quick disconnect cable instead of a threaded member. Also, an assembly in which the terminal connector is integrally molded into the battery cover in order to provide precise location and orientation, and eliminate secondary manufacturing operations. It should be understood that all such modifications and improvements have been deleted herein for the sake of conciseness and readability but are properly within the scope of the following claims.

We claim:

1. An improved terminal post assembly for a lead/acid battery of the type including a casing enclosing a plurality of lead plates connected together, said assembly comprising:
   (a) a battery cover forming a part of one of the top or side walls of said battery casing;
   (b) a lead electrode post connected at one end to the plates of said battery and the other end extending through an opening in the surface of said battery cover; and
   (c) a non-lead connector welded directly to the other end of said electrode post extending through the surface of said battery cover.

2. The assembly according to claim 1, further including a conductive transition layer between said lead electrode post and said non-lead connector.

3. The assembly according to claim 2, wherein said transition layer includes a first layer of a corrosive resistant metal coating the surface of said non-lead connector.

4. The assembly according to claim 3, wherein said first layer of a corrosive resistant metal coating the surface of said non-lead connector is selected from the group consisting of silver, gold and platinum and their alloys.

5. The assembly according to claim 4, wherein said first layer of a corrosive resistant metal coating the surface of said non-lead connector is silver.

6. The assembly according to claim 3, wherein said transition layer further includes a second layer of a lead compatible metal coating the surface of said non-lead connector adjacent said lead electrode post.

7. The assembly according to claim 6, wherein said second layer of a lead compatible metal coating the surface of said post is tin.

8. The assembly according to claim 3, wherein said transition layer includes a first layer of a corrosive resistant metal coating the surface of said non-lead connector and a second layer of a lead compatible metal coating the surface of said lead electrode post, said first and second layers being compatible with each other.

9. The assembly according to claim 1, wherein said battery cover includes a terminal support well surrounding said opening which receives said other end of said electrode post.

10. The assembly according to claim 9, wherein said terminal support well includes an upstanding wall surrounding said opening.

11. The assembly according to claim 9, wherein said terminal support well includes a locating means in the floor thereof for positioning said non-lead connector with respect to said opening for receiving one end of said electrode post.

12. The assembly according to claim 9, wherein the floor of said terminal support well includes an elastomeric seal between the walls forming said opening and said electrode post.

13. The assembly according to claim 10, wherein said upstanding wall surrounding said opening is adapted to receive a potting compound which forms a seal over the portion of said non-lead connector attached to said lead electrode post.

14. The assembly according to claim 1, wherein said lead electrode post is formed from a lead-based alloy.

15. The assembly according to claim 1, wherein a portion of said lead electrode post extends above the surface of said a non-lead connector.

16. The assembly according to claim 1, wherein the volume of the portion of said lead electrode post extending above the surface of said non-lead connector is substantially equal to the amount of material necessary to form a weld directly between said lead electrode post and said non-lead connector.

17. The assembly according to claim 1, further including a terminal attached to said non-lead connector adapted to receive an electrical cable for conducting the electricity produced by said battery wherein said terminal is a threaded bolt attached to said non-lead connector.

18. A non-lead connector for a terminal post assembly for a lead/acid battery having a battery cover forming a part of one of the top or side walls of said battery and a lead electrode post connected at one end to the plates of said battery and the other end extending through the surface of said battery cover, said connector comprising:
   (a) a substantially flat base member having an aperture therein in one end for receiving the other end of said electrode post which extends through the surface of said battery cover; and
   (b) a boss member extending upwardly from the other end of said base member and having a bore therein for receiving a terminal adapted to receive an electrical cable for conducting the electricity produced by said battery.

19. The connector according to claim 18, wherein said base member includes a reservoir surrounding said aperture for providing a larger surface area for lead from said post to attach to during the soldering operation.

20. The connector according to claim 19, wherein the volume of said reservoir is substantially equal to the amount of material removed from said lead post to form the weld between said lead electrode post and said non-lead connector.

21. The connector according to claim 18, wherein said base member includes a locating means which cooperates with a pin on said cover to properly position said non-lead connector with respect to said cover.

22. The connector according to claim 18, wherein the bore in said boss member is threaded and one end of said terminal includes complementary threads to allow said terminal to be attached to said boss member.

23. The connector according to claim 18, wherein said boss member includes at least two flat sides to facilitate attachment of a cable connector while reducing the amount of torque transmitted to said connector and said post.

24. The connector according to claim 18, wherein said connector is formed from a copper alloy.

25. The connector according to claim 24, wherein said copper alloy is a creep resistant alloy selected from the group including bronze, brass, copper-nickel and tellurium-copper, beryllium copper, and copper.

26. The connector according to claim 24, wherein said copper alloy is bronze.

27. The connector according to claim 18, wherein said non-lead connector is formed of a material exhibiting lower resistance, higher conductivity, and lower creep than lead.

28. The connector according to claim 27, wherein said connector formed from said material is capable of carrying greater than about 1100 amps without failure.

29. The connector according to claim 27, wherein the density of said material is less than about 80% that of lead.

30. An improved terminal post assembly for a lead/acid battery of the type including a casing enclosing a plurality of lead plates connected together, said assembly comprising:
   (a) a battery cover forming a part of one of the top or side walls of said battery casing;
   (b) a lead electrode post connected at one end to the plates of said battery and the other end extending through an opening in the surface of said battery cover; and
   (c) a non-lead connector yielded directly to the other end of said electrode post extending through the surface of said battery cover, said connector including: (i) a substantially flat base member having an aperture therein in one end for receiving the other end of said electrode post which extends through the surface of said battery cover; and (ii) a boss member extending upwardly from the other end of said base member and having a bore therein for receiving a terminal adapted to receive an electrical cable for conducting the electricity produced by said battery.

31. The assembly according to claim 30, further including a conductive transition layer between said lead electrode post and said non-lead connector wherein said transition layer includes a first layer of a corrosive resistant metal coating the surface of said non-lead connector.

32. The assembly according to claim 31, wherein said first layer of a corrosive resistant metal coating the surface of said non-lead connector is selected from the group consisting of silver, gold and platinum and their alloys.

33. The assembly according to claim 32, wherein said first layer of a corrosive resistant metal coating the surface of said non-lead connector is silver.

34. The assembly according to claim 31, wherein said transition layer further includes a second layer of a lead compatible metal coating the surface of said non-lead connector adjacent said lead electrode post.

35. The assembly according to claim 34, wherein said second layer of a lead compatible metal coating the surface of said post is tin.

36. The assembly according to claim 31, wherein said transition layer includes a first layer of a corrosive resistant metal coating the surface of said non-lead connector and a second layer of a lead compatible metal coating the surface of said lead electrode post, said first and second layers being compatible with each other.

37. The assembly according to claim 30, wherein said battery cover includes a terminal support well surrounding said opening which receives said other end of said electrode post.

38. The assembly according to claim 37, wherein said terminal support well includes an upstanding wall surrounding said aperture.

39. The assembly according to claim 37, wherein said terminal support well includes a locating means in the floor thereof for positioning said non-lead connector with respect to said aperture for receiving one end of said electrode post.

40. The assembly according to claim 37, wherein the floor of said terminal support well includes an elastomeric seal between the walls forming said aperture and said electrode post.

41. The assembly according to claim 37, wherein said upstanding wall surrounding said aperture is adapted to receive a potting compound which forms a seal over the portion of said non-lead connector attached to said lead electrode post.

42. The assembly according to claim 30, wherein said lead electrode post is formed from a lead-based alloy.

43. The assembly according to claim 30, wherein a portion of said lead electrode post extends above the surface of said non-lead connector.

44. The assembly according to claim 43, wherein the volume of the portion of said lead electrode post which extends above the surface of said non-lead connector is substantially equal to the amount of material necessary to form a weld directly between said lead electrode post and said non-lead connector.

45. The assembly according to claim 30, further including a terminal attached to said non-lead connector adapted to receive an electrical cable for conducting the electricity produced by said battery wherein said terminal is a threaded bolt attached to said non-lead connector.

46. The assembly according to claim 30, wherein said base member includes a reservoir surrounding said aperture for providing a larger surface area for lead from said post to attach to during the soldering operation.

47. The assembly according to claim 46, wherein the volume of said reservoir is substantially equal to the amount of material removed from said lead post to form the weld between said lead electrode post and said non-lead connector.

48. The assembly according to claim 30, wherein said base member includes a locating means which cooperates with a pin on said cover to properly position said non-lead connector with respect to said cover.

49. The assembly according to claim 30, wherein the bore in said boss member is threaded and one end of said terminal includes complementary threads to allow said terminal to be attached to said boss member.

50. The assembly according to claim 30, wherein said boss member includes at least two flat sides to facilitate attachment of a cable connector while reducing the amount of torque transmitted to said connector and said post.

51. The assembly according to claim 30, wherein said connector is formed from a copper alloy.

52. The assembly according to claim 51, wherein said copper alloy is a creep resistant alloy selected from the group including bronze, brass, copper-nickel, tellurium-copper, beryllium-copper and copper.

53. The assembly according to claim 51, wherein said copper alloy is bronze.

54. The assembly according to claim 30, wherein said non-lead connector is formed of a material exhibiting lower resistance, higher conductivity, and lower creep than lead.

55. The assembly according to claim 54, wherein said connector formed from said material is capable of carrying greater than about 1100 amps without failure.

56. The assembly according to claim 54, wherein the density of said material is less than about 80% that of lead.

57. A lead/acid battery of the type including a plurality of lead plates connected together, said battery comprising:
   (a) a battery casing;
   (b) a battery cover forming a part of one of the top or side walls of said battery casing;
   (c) a lead electrode post connected at one end to the plates of said battery and the other end extending through an opening in the surface of said battery cover; and
   (d) a non-lead connector welded directly to the other end of said electrode post.

58. The battery according to claim 57, wherein a portion of said electrode post extends above the surface of said non-lead connector.

59. The battery according to claim 57, wherein said non-lead connector includes a reservoir surrounding said electrode post and the volume of said portion of said electrode post is substantially equal to the amount material necessary to form a weld directly between said lead electrode post and said non-lead connector.

60. The battery according to claim 57, further comprising a terminal support well defined within an upstanding wall surrounding said opening in the surface of said battery cover.

61. The battery according to claim 60, wherein the floor of said terminal support well includes an elastomeric seal between said opening and said electrode post.

62. The battery according to claim 60, wherein said terminal support well is adapted to receive a potting compound which forms a seal over the direct bond between said non-lead connector and said lead electrode post.

63. The battery according to claim 57, further including a terminal attached to said non-lead connector adapted to receive an electrical cable for conducting the electricity produced by said battery wherein said terminal is a threaded bolt attached to said non-lead connector.

* * * * *

UNITED STATES PATENT AND TRADEMARK OFFICE
CERTIFICATE OF CORRECTION

PATENT NO : 6001506
DATED : December 14, 1999
INVENTOR(S): John B. Timmons; Edward F. Koss It is certified that error appears in the above-identified patent and that said Letters Patent are hereby corrected as shown below:

In Claim 30, line 1 of subparagraph (c), change "yielded" to --welded--.

Signed and Sealed this

Tenth Day of April, 2001

Attest:

NICHOLAS P. GODICI

Attesting Officer         Acting Director of the United States Patent and Trademark Office